US011364840B2

(12) United States Patent
Guenther et al.

(10) Patent No.: US 11,364,840 B2
(45) Date of Patent: Jun. 21, 2022

(54) TRIM ELEMENT FOR A MOTOR VEHICLE FRONT END HAVING AN ILLUMINATION DEVICE

(71) Applicant: Bayerische Motoren Werke Aktiengesellschaft, Munich (DE)

(72) Inventors: Alf Guenther, Traunstein (DE); Hans-Juergen Winkler, Kaufering (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/969,025

(22) PCT Filed: Apr. 29, 2019

(86) PCT No.: PCT/EP2019/060856
§ 371 (c)(1),
(2) Date: Aug. 11, 2020

(87) PCT Pub. No.: WO2019/214974
PCT Pub. Date: Nov. 14, 2019

(65) Prior Publication Data
US 2021/0023982 A1 Jan. 28, 2021

(30) Foreign Application Priority Data

May 9, 2018 (DE) ..................... 10 2018 207 270.1

(51) Int. Cl.
*B60Q 1/26* (2006.01)
*F21S 41/151* (2018.01)
(Continued)

(52) U.S. Cl.
CPC ............. *B60Q 1/2661* (2013.01); *B60Q 1/18* (2013.01); *F21S 41/151* (2018.01); *B60Q 1/24* (2013.01);
(Continued)

(58) Field of Classification Search
CPC .......... B60Q 1/2661; B60Q 1/18; B60Q 1/24; B60Q 1/28; B60Q 1/2696; F21S 41/151;
(Continued)

(56) References Cited

U.S. PATENT DOCUMENTS 1,551,720 A * 9/1925 Williamson ............. B60Q 1/28
362/496
2,403,856 A 7/1946 Gonzalez
(Continued)

FOREIGN PATENT DOCUMENTS

DE 103 37 615 B3 4/2005
DE 10337615 B3 * 4/2005 ............... B60Q 1/28
(Continued)

OTHER PUBLICATIONS

Jocher, Apr. 21, 2005, DE10337615B3 (Year: 2005).*
(Continued)

*Primary Examiner* — Jong-Suk (James) Lee
*Assistant Examiner* — James M Endo
(74) *Attorney, Agent, or Firm* — Crowell & Moring LLP

(57) ABSTRACT

A trim element for a motor vehicle front end includes a first trim part, a second trim part and a lighting device, which is at least substantially integrated into the first trim part and by which at least the second trim part is illuminated on the outside of the motor vehicle when the lighting device is activated. The lighting device has at least one illuminant, by which a front field in front of the motor vehicle front end can be specifically illuminated when the lighting device is activated.

20 Claims, 5 Drawing Sheets

(51) Int. Cl.
  *B60Q 1/18* (2006.01)
  *F21Y 103/10* (2016.01)
  *F21Y 115/10* (2016.01)
  *B60Q 1/24* (2006.01)

(52) U.S. Cl.
  CPC ....... *F21Y 2103/10* (2016.08); *F21Y 2115/10* (2016.08)

(58) Field of Classification Search
  CPC ........ F21S 41/147; F21S 41/148; F21S 41/19; F21S 41/50; F21S 41/55; F21S 43/50; F21S 43/51
  See application file for complete search history.

(56) References Cited

U.S. PATENT DOCUMENTS

| | | | | | |
|---|---|---|---|---|---|
| 3,196,265 | A | * | 7/1965 | Schneider | B60Q 1/28 362/505 |
| 6,520,669 | B1 | * | 2/2003 | Chen | F21S 41/143 362/545 |
| 6,709,141 | B1 | * | 3/2004 | Sisti | B60Q 1/12 362/259 |
| 7,163,320 | B2 | * | 1/2007 | Liu | B60Q 1/2661 362/469 |
| 9,840,218 | B1 | * | 12/2017 | Wymore | B60R 19/50 |
| 2005/0094405 | A1 | * | 5/2005 | Tatewaki | G09F 13/02 362/341 |
| 2005/0094409 | A1 | * | 5/2005 | Elwell | B60Q 1/2661 362/496 |
| 2005/0213342 | A1 | * | 9/2005 | Tufte | G09F 21/10 362/551 |
| 2007/0058382 | A1 | * | 3/2007 | Lan | B60Q 1/2661 362/487 |
| 2008/0043484 | A1 | * | 2/2008 | Lin | F28F 9/002 362/511 |
| 2013/0293104 | A1 | * | 11/2013 | Wu | B60R 19/52 315/77 |
| 2014/0347871 | A1 | | 11/2014 | Huttenlocher | |
| 2015/0021937 | A1 | * | 1/2015 | Perez | B60Q 1/2661 293/115 |
| 2015/0138807 | A1 | * | 5/2015 | Salter | B60Q 1/2661 362/510 |
| 2015/0217681 | A1 | * | 8/2015 | Dellock | B60Q 1/26 362/510 |
| 2015/0298597 | A1 | * | 10/2015 | Salter | B60Q 1/2661 362/510 |
| 2016/0066559 | A1 | * | 3/2016 | Russell | A01M 29/10 119/712 |
| 2016/0090027 | A1 | * | 3/2016 | Tanaka | B60Q 1/2661 362/516 |
| 2016/0245475 | A1 | * | 8/2016 | Dubose | B60Q 1/0035 |
| 2016/0288700 | A1 | * | 10/2016 | Chen | B60Q 1/28 |
| 2017/0297480 | A1 | * | 10/2017 | Elwell | F21S 45/47 |
| 2018/0027634 | A1 | * | 1/2018 | Dalavayi | H05B 47/105 315/77 |
| 2018/0361971 | A1 | | 12/2018 | Drozdzyk et al. | |

FOREIGN PATENT DOCUMENTS

| | | |
|---|---|---|
| DE | 10 2009 039 038 A1 | 3/2011 |
| DE | 20 2012 008 792 U1 | 1/2013 |
| DE | 10 2011 120 363 A1 | 6/2013 |
| DE | 10 2012 009 291 A1 | 11/2013 |
| DE | 10 2014 015 185 A1 | 4/2015 |
| DE | 10 2016 203 964 A1 | 9/2017 |
| EP | 3 059 120 A1 | 8/2016 |
| JP | 2015-220205 A | 12/2015 |

OTHER PUBLICATIONS

International Search Report (PCT/ISA/210 & PCT/ISA/220) issued in PCT Application No. PCT/EP2019/060856 dated Aug. 21, 2019 with English translation (11 pages).

German-language Written Opinion (PCT/ISA/237) issued in PCT Application No. PCT/EP2019/060856 dated Aug. 21, 2019 (seven pages).

German-language Search Report issued in German Application No. 10 2018 207 270.1 dated Jul. 23, 2018 with partial English translation (11 pages).

* cited by examiner

TRIM ELEMENT FOR A MOTOR VEHICLE FRONT END HAVING AN ILLUMINATION DEVICE

BACKGROUND AND SUMMARY OF THE INVENTION

The invention relates to a trim element for a motor vehicle front end having an illumination device.

Illumination devices on modern motor vehicles or illumination devices of modern motor vehicles contribute to a particularly high degree to traffic safety because the corresponding motor vehicle is visible from the outside owing to the respective illumination device, in particular if the environment is dark. In the same way, the respective illumination devices serve for illuminating a front field in front of the motor vehicle, with the result that a driver of the motor vehicle has a particularly good view into the front field, even in a dark environment. Here, the respective illumination device typically comprises two laterally arranged main headlamps, with which the front field at a relatively great distance of the motor vehicle is able to be illuminated.

Furthermore, the respective illumination device can be used to give the vehicle a very special, in particular brand-specific character. In addition, a viewer arranged in a dark environment, such as at night, outside the motor vehicle can, owing to a brand-specific arrangement and/or shape of the respective illumination devices, detect the motor vehicle particularly easily, in particular also from a relatively great distance to the motor vehicle and/or can connect the latter to a specific manufacturer. To further increase such a recognition value, provision may be made for particularly characteristic external components of the respective motor vehicle, for example brand-specific symbols, edge profiles and/or other particularly brand-specific components, to be illuminated by means of the respective illumination device.

DE 10 2009 039 038 A1, for example, discloses a radiator grille having a multiplicity of parallel air vents with at least one light source that illuminates the air vents, which are pivotable between two positions, in a manner such that a light pattern that is perceivable on the basis of the air vents in one of the two positions is produced.

In addition, DE 10 2014 015 185 A1 discloses an add-on part for a vehicle with at least one light-emitting unit for producing a light distribution on at least one section of the add-on part, wherein the light-emitting unit comprises a housing that is formed such that light produced by means of at least one light source is able to be coupled out of the housing such that a light/dark boundary of the light distribution is substantially formed at an edge of the at least one section of the add-on part.

Furthermore, DE 20 2012 008 792 U1 discloses a light-emitting apparatus for a radiator cover of a vehicle, having at least one light-emitting cover unit and having a plurality of hollow, light-transmissive ribs, wherein each of the light-transmissive ribs has a receiving space. This light-emitting apparatus furthermore has a plurality of light-emitting units, of which each is arranged in the inner receiving space of a corresponding light-transmissive rib and is connected to a control unit that drives the respective light-emitting units in a first light-emission mode in which the light emission of each of the light-emitting units is changed depending on at least the sound in the vehicle.

These illumination devices have in common that they are in each case not suitable for illuminating a front field in front of the motor vehicle, in particular so as to comply with the law. Particular attention should here be given to a region of the front field in front of the motor vehicle that is arranged particularly close to a motor vehicle front end. It is not possible using today's typical main headlamps to directly illuminate a specific region of the front field in front of the motor vehicle, which means that there exists a region that is not illuminated, in particular a dark region, in front of the motor vehicle front end, in particular between the two lateral main headlamps. Objects or short people, for example small children, which enter this dark region in the front field in front of the motor vehicle without being noticed, can in this way be missed by the driver of the motor vehicle, possibly resulting in a traffic accident.

It is an object of the present invention to provide a light-emitting device for a motor vehicle that supports traffic safety of the motor vehicle.

This object is achieved by a trim element for a motor vehicle front end according to the claimed invention.

The invention makes provision for a trim element for a motor vehicle front end, having a first trim part and a second trim part. In a state in which they are fixed to each other, the two trim parts can at least partially form the trim element. For this purpose, the two trim parts can be formed in one piece or be attached to each other in a different manner by way of a force fit, form fit and/or a material bond. The trim element further comprises a light-emitting device that is at least substantially integrated into the first trim part and is used to illuminate at least the second trim part outside on the motor vehicle in an activated state of the light-emitting device. Since at least the second trim part, that is to say the second trim part or both the first and the second trim part, is/are able to be illuminated or is/are illuminated by means of the light-emitting device, a particularly high recognition value is ensured for the motor vehicle that is equipped with the trim element according to the invention. In particular when the first and/or the second trim part has/have a particularly characteristic, in particular manufacturer-specific, form, a viewer arranged outside the motor vehicle can particularly easily recognize the motor vehicle and/or connect it to a specific manufacturer from a particularly great distance and/or in a dark environment, for example at night. Moreover, such light implementations are increasingly gaining importance because a particularly pleasing design of the overall illumination device of the motor vehicle leads to an impression of particularly high quality and consequently to a particularly high satisfaction among customers.

In order to increase traffic safety of the motor vehicle compared to a traditional motor vehicle by means of the light-emitting device, the invention makes provision for the light-emitting device to comprise at least one illuminant, using which the front field in front of the motor vehicle front end is illuminated in a targeted fashion in the activated state of the light-emitting device. That means that the light-emitting device comprises at least the at least one illuminant by means of which the front field, in particular the previously described dark region in the front field, in front of the motor vehicle front end is able to be irradiated in a targeted fashion by light. Furthermore, the first and/or both the first and the second trim part can be illuminated by means of the at least one illuminant in the activated state of the light-emitting device. In this case, the at least one illuminant has a double function since it illuminates at least the second trim part and also illuminates the front field in a targeted fashion in the activated state of the light-emitting device.

However, provision may also be made for the light-emitting device to comprise not only the at least one illuminant, but also at least one further illuminant. Accordingly, one of the illuminants can be configured to light at least the second trim part, in particular only the at least second trim part, wherein the correspondingly other one of the illuminants can be embodied to light, in particular only, the front field in front of the motor vehicle front end in a targeted fashion in the activated state of the light-emitting device.

At any rate, the trim element according to the invention having the light-emitting device provides highly targeted illumination of the front field in front of the motor vehicle front end, wherein even a region of the front field arranged between the two main headlamps is able to be illuminated, which region is not able to be illuminated solely by the main headlamps, or is able to be illuminated solely by the main headlamps only indirectly, that is to say for example only by means of stray light of the main headlamps.

This is advantageous in as far as an object that has entered the front field unnoticed and/or a person that has entered the front field unnoticed can be irradiated by means of the light-emitting device of the trim element with visible, in particular white, light, as a result of which the object and/or the person are/is particularly easily recognized by the driver of the motor vehicle. The traffic safety of the motor vehicle equipped with the trim element according to the invention is much greater in particular in a dark environment, for example at night, as compared to traditional motor vehicles, because the object and/or the person or the small child are illuminated and consequently particularly easily perceivable even in the case of slow driving and/or at the beginning of a journey of the motor vehicle. After all, if the light-emitting device is activated for example together with an unlocking of the motor vehicle from a distance, the driver can already recognize whether an obstacle is arranged in the front field in front of the motor vehicle and react accordingly even as they are walking toward the motor vehicle.

It is particularly advantageous if the second trim part is illuminated counter to a vertical vehicle direction by means of the light-emitting device in the activated state thereof. That means that the light-emitting device and/or a light exit surface thereof can be arranged at an upper region of the first trim part, with the result that, in the activated state, the second trim part is illuminated downwardly from above. In particular, the second trim part can be illuminated without reflector and/or lens, which means that a light beam emitted from the light-emitting device or from the light exit surface of the light-emitting device is incident on a surface of the second trim part that is to be illuminated without reflector and/or lens. Illuminating at least the second trim part from above or counter to the vertical vehicle direction is particularly advantageous because a person arranged outside the motor vehicle, in particular in a vicinity of the motor vehicle, can turn their gaze to the motor vehicle without being dazzled. This consequently provides a particularly high degree of traffic safety for the motor vehicle because the person is not dazzled by the motor vehicle, in particular not by the light-emitting device of the motor vehicle. The trim element and consequently the illuminant is thus able to be designed in accordance with regulations, in particular with respect to legal specifications.

In order to further reduce the risk of dazzling of the person arranged outside the motor vehicle, provision is made in a further configuration of the trim element for a direct line of sight between a point arranged in a specified region outside the motor vehicle and a light exit surface of the light-emitting device, in particular the previously described one, to be interrupted by at least one component of the motor vehicle. This specified region may be specified by law. Consequently, the risk of the person arranged outside the motor vehicle being dazzled is reduced further. The line of sight between the point arranged in the specified region and the light exit surface can be interrupted for example by a screening element of the motor vehicle that is specifically provided for this purpose. However, it is particularly preferred if the light-emitting device is integrated into the two trim parts in the motor vehicle such that a component that is already present at the motor vehicle interrupts the direct line of sight.

In a particularly advantageous configuration of the trim element, the first trim part has a through-opening through which light is able to shine and which corresponds to a light exit surface of the light-emitting device. In other words, in the activated state of the light-emitting device, the first trim part transmits light that is produced and emitted by the light-emitting device or by the least one illuminant. To ensure a particularly efficient and large-area illumination of the front field by means of the light-emitting device, provision may be made for the through-opening to follow a contour of the first trim part, for example to be embodied to be elongate.

The through-opening can be arranged obliquely with respect to the vertical vehicle direction, that is to say that a penetration direction of the through-opening can extend obliquely. Hereby, a screening effect can be achieved in such a manner that elements behind the trim elements of the motor vehicle advantageously remain unilluminated by the activated light-emitting device. In addition, oblique arrangement of the through-opening can favor efficient illumination of the front field in front of the motor vehicle, since the light beam can pass through the oblique through-opening, as a result of which a particularly large area of the front field is able to be illuminated.

The through-opening can furthermore have at least one bar to ensure the stability of the first trim part and/or to further intensify a previously described dazzle protection. Furthermore, a lateral view onto the illuminant is prevented, meaning that legal specifications are observed.

The light-emitting device is able to be integrated particularly easily into the trim element if the light-emitting device has a particularly compact design or a design that is particularly efficient in terms of installation space. For this purpose, it is particularly advantageous if the light-emitting device has at least one LED element. In other words, the least one illuminant can be embodied as an LED (light-emitting diode). Furthermore, the illuminant can have a plurality of LEDs, wherein the respective LEDs, also referred to as light-emitting diodes, are embodied in particular to emit light with a particularly high white portion. However, other light colors are also conceivable, for example for setting accents in the region of the motor vehicle front end, for example at events away from public roads. Since a light-emitting diode requires only particularly little electric power to emit light, it is advantageously possible to dispense with heatsinks connected to the LED, as a result of which the light-emitting device is able to be embodied to be particularly efficient in terms of installation space and/or mass. As a result, the motor vehicle equipped with the trim element according to the invention can be produced particularly efficiently in terms of mass, meaning that it is able to be operated in a manner that is particularly efficient in terms of power or fuel and/or with low emissions.

It is furthermore advantageous if the light-emitting device is configured to be at least substantially strip-shaped. In particular in cooperation with the for example elongate through-opening of the first trim part, this produces an area-covering exit rather than just a point-shaped exit of the light beam that is produced by means of the light-emitting device and that irradiates at least the second trim part. In connection with the light-emitting device having at least one LED element, the light-emitting device should then be embodied to be simply strip-shaped or elongate, with the result that this elongate light-emitting device can then be particularly easily made to coincide with the through-opening. In other words, the elongate through-opening and the light-emitting device having an elongate design can correspond to one another. For example, provision can be made for the elongate light-emitting device to be inserted in or to engage with the elongate through-opening at least partially in a form-fitting manner. Accordingly, the light-emitting device can be embodied for example in the form of an LED strip, an LED tape, etc. To this end, for example, a plurality of LEDs can be arranged on a common carrier strip. However, it is also conceivable that the light-emitting device has a single LED, wherein at least the light emission surface thereof corresponds to the elongate through-opening, that is to say the light emission surface is embodied to be elongate, strip-shaped and/or flat.

Alternatively or additionally, provision may be made for the light-emitting device to have at least one light-guiding element. Such a light-guiding element or light-directing element can have a refractive, filtering, converging and/or reflective effect on the light beam passing through the element. For example, the light-guiding element or light-directing element can have at least one light-guiding fiber element, which is embodied at least substantially as a clear fiber. For example, glass or a clear plastic is conceivable here as the material of the clear fiber. In this case, the corresponding light-directing element or light-guiding element can be designed such that light exit takes place transversely to the fiber direction and/or along the fiber direction. Provision may be made for the at least one light-guiding element to at least partially form the light exit surface of the light-emitting device. In this case it is advantageous that the at least one illuminant of the light-emitting device is able to be positioned particularly variably into the trim element and/or into the motor vehicle because the light beam emerging from the illuminant is directable particularly efficiently by means of the light-guiding element to the region that is to be illuminated, in particular to the second trim part and to the front field in front of the vehicle. In other words, the at least one illuminant of the light-emitting device can be arranged away from the second trim part, in particular at a particularly great distance therefrom, as a result of which the at least one illuminant is able to be arranged for example at a region of the trim element and/or of the motor vehicle that is able to be cooled particularly well.

In order to protect the trim part, in particular the light-emitting device, with a particularly high degree of resistance against external influences, in particular those that occur in the case of or during the driving operation of the motor vehicle, a further advantageous embodiment makes provision for a protective element that is arranged inside on the first trim part and at least partially covers the light-emitting device on the inside, in particular inside the first trim part. Consequently, the light-emitting device is particularly stable and/or resistant with respect to heat, dust, vibration due to the driving operation, damage to conductor tracks during installation or disassembly, etc. For this purpose, the protective element can comprise for example an adhesive strip or be at least formed substantially by the adhesive strip. That means that the protective element is adhesively bonded, or able to be adhesively bonded, to the light-emitting device, in particular to the at least one illuminant. This brings about a particularly good positional hold of the protective device on the light-emitting device or on the least one illuminant. Provision may be made for the protective element or the adhesive strip to be able to be adhesively bonded or to be adhesively bonded to the light-emitting device or the at least one illuminant and to the first trim part. This brings about a particularly good positional hold of the protective device or of the adhesive strip on the first trim part or on the light-emitting device, with the result that the light-emitting device is able to be attached or is attached in a particularly fixed position to the first trim part by means of the adhesive strip.

Alternatively or additionally, a protective element that is arranged on the outside of the first trim part and covers the light-emitting device on the outside, in particular on the outside of the second trim element, in particular on the outside of the light exit surface, is provided. This outside protective element can be formed for example as a clear material by means of which the through-opening is entirely filled along a longitudinal extent thereof and is filled entirely or partially along the vertical vehicle direction. Furthermore, the outside protective element can comprise an at least substantially clear adhesive strip or be at least partially formed therefrom. Due to the outside protective element, objects, such as grit or other objects whirled up by a motor vehicle that is driving in front, are effectively prevented from entering the trim element from the outside through the through-opening and from being hurled there onto the light-emitting device, in particular onto the at least one illuminant. That means that the outside protective element at least counteracts damage to the light-emitting device.

Furthermore, at least one opaque screening element that is arranged on the first trim part and is irradiated by the light-emitting device in the activated state thereof can be provided on the trim element, as a result of which illumination of a component of the motor vehicle that differs from the trim element is prevented. In other words, the screening element is of opaque design and casts a desired shadow as appropriate, so that components of the motor vehicle are shaded or screened off so that it is not able to illuminate them by way of the light-emitting device. These components of the motor vehicle that are to be screened off can be, for example, an engine compartment, elements arranged therein, for example carrier, radiator, etc. This effectively prevents a situation in which an object in the interior of the motor vehicle, in particular behind the trim element, that is not esthetically pleasing is illuminated, which would interfere with the desired character of the motor vehicle.

Further features of the invention can be gathered from the claims, the figures, and the description of the figures. The features and feature combinations mentioned above in the description and the features and feature combinations mentioned below in the description of the figures and/or showing alone in the figures can not only be used in the respectively stated combination, but also in other combinations or alone.

The invention will now be explained in more detail on the basis of a preferred exemplary embodiment and with reference to the drawings.

BRIEF DESCRIPTION OF THE DRAWINGS

Identical elements or elements having identical function are provided with the same reference signs in the figures.

DETAILED DESCRIPTION OF THE DRAWINGS

Figure 1:
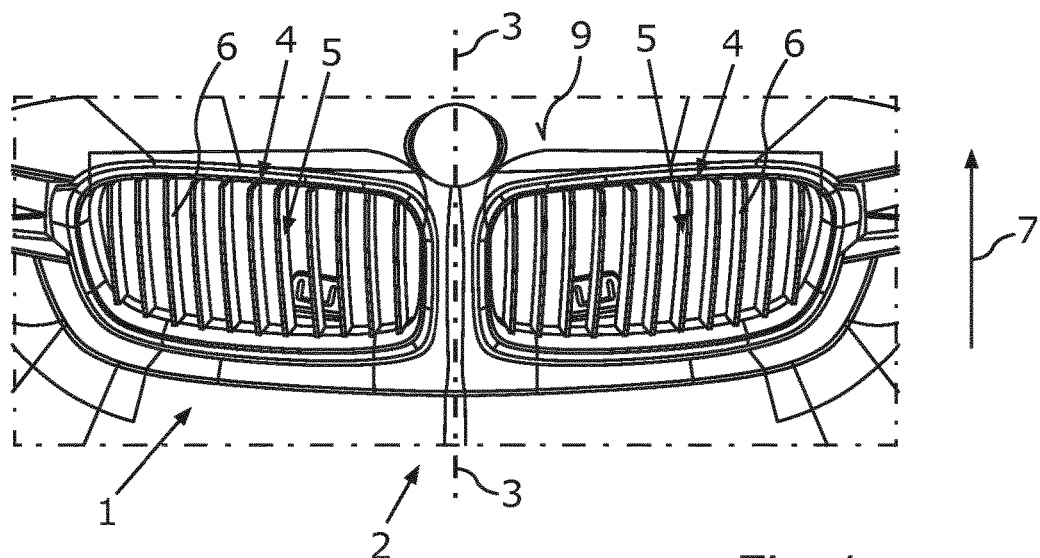
FIG. 1 is a partial illustration of a trim element for a motor vehicle front end.

FIG. 1 shows a partial illustration of a trim element 1 for a motor vehicle front end 2. The motor vehicle front end 2 is typically at least substantially symmetric, that is to say embodied in the manner of a mirror image with respect to a mirror axis 3. In the present example, the motor vehicle front end 2 has two first trim parts 4, which are arranged in the manner of a mirror image with respect to one another, and two second trim parts 5, which are arranged in the manner of a mirror image with respect to one another. As shown in FIG. 1, the respective first trim part 4 can describe an annular kidney shape. The respective second trim part 5 has a multiplicity of ribs 6, which extend at least substantially along a vertical vehicle direction 7 and are in each case entirely surrounded by the first trim part 4, or the first trim part 4 engages entirely around the perimeter. The trim element 1, that is to say the respective first trim parts 4 and the respective second trim parts 5, can be used to cover internal components of a motor vehicle 8 (see FIG. 2), for example a water cooler and/or oil cooler, carrying structures, etc., as a result of which the motor vehicle 8 is given a particularly pleasing and/or aerodynamic outer skin 9.

Figure 2:
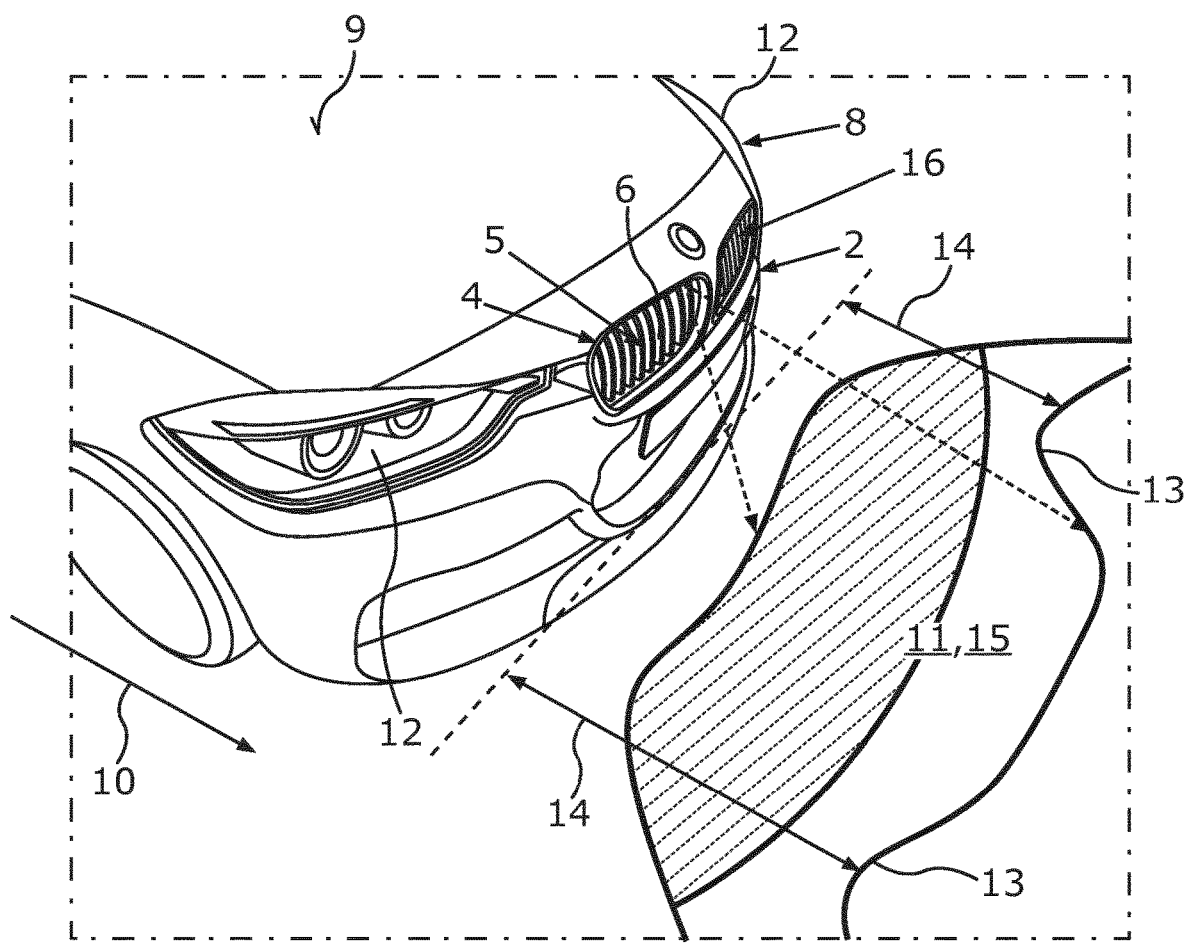
FIG. 2 is a perspective illustration of a motor vehicle having the motor vehicle front end.

FIG. 2 shows a perspective illustration of the motor vehicle 8 with the motor vehicle front end 2 and a front field 11 arranged upstream of the motor vehicle front end 2 or upstream of the motor vehicle 8 in the vehicle longitudinal direction 10. Using two lateral main headlamps 12, the front field 11 is able to be illuminated, wherein a respective light/dark boundary 13 of the two main headlamps 12 is arranged, over a distance 14, particularly far from the motor vehicle front end 2. Between the light/dark boundary 13 of the two main headlamps 12 and a front edge of the motor vehicle front end 2, there is accordingly a region 15 of the front field 11 that is ineffectively illuminated, for example illuminated to a particularly minor degree, because this region is not able to be supplied with light by the main headlamps 12 on account of the respective lateral installation positions thereof. As a consequence, there is the risk that an object that has entered this region 15 unnoticed and/or that a person, for example a small child, that has entered this region 15 unnoticed, is/are missed by a driver of the motor vehicle 8. This can result in a traffic accident if the motor vehicle 8, upon driving off, collides with the unnoticed object and/or with the unnoticed person.

To counteract this situation, the trim element 1 has a light-emitting device 16, which is integrated at least partially, preferably for the main part, with particular preference entirely, into the first trim part 4.

The light-emitting device 16 is switchable between an activation state and a deactivation state, wherein at least the second trim part 5 is illuminated outside on the motor vehicle 8 by means of the light-emitting device 16 in the activation state by way of a light beam being produced by means of the light-emitting device 16 that is directed at the second trim part 5. In this way, the second trim part 5, in particular the ribs 6 extending along the vertical vehicle direction 7, can be staged in a particularly characteristic manner by way of the light staging. In this way, a particularly high recognition value of the motor vehicle 8 that is equipped with the trim element 2 and/or a particular, manufacture-specific character is/are able to be produced or is/are produced in this way.

In order to support traffic safety of the motor vehicle 8 by means of the light-emitting device 16, provision is made for the light-emitting device 16 to have at least one illuminant 17 (shown first in FIG. 4), by means of which, in the activation state of the light-emitting device 16, the front field 11, in particular the region 15 of the front field 11 that is not directly reachable by the main headlamps 12, in front of the motor vehicle front end 2 is illuminated in a targeted fashion. One advantage of this is for example that the region 15 can already be illuminated by means of the light-emitting device 16 if the driver activates the light-emitting device 16 in particular from outside the motor vehicle 8. This can already be done, together with unlocking of the motor vehicle 8, from a distance, such that the driver can already recognize whether there is an obstacle in the region 15 of the motor vehicle 8 and react accordingly while they are walking toward the motor vehicle 8.

The light-emitting device 16 moreover has the advantage that it is particularly easy, for example in the case of servicing with an open engine hood, to find parts that have dropped to the ground. Furthermore, the light-emitting device 16 ensures surefootedness because a worker does not step into liquid puddles (oils, coolant, etc.) and/or does not bump into objects. This is because the liquid puddles or objects are able to be irradiated by light on account of the light-emitting device 16 even when the hood is open and are therefore particularly easily detectable.

Figure 3:
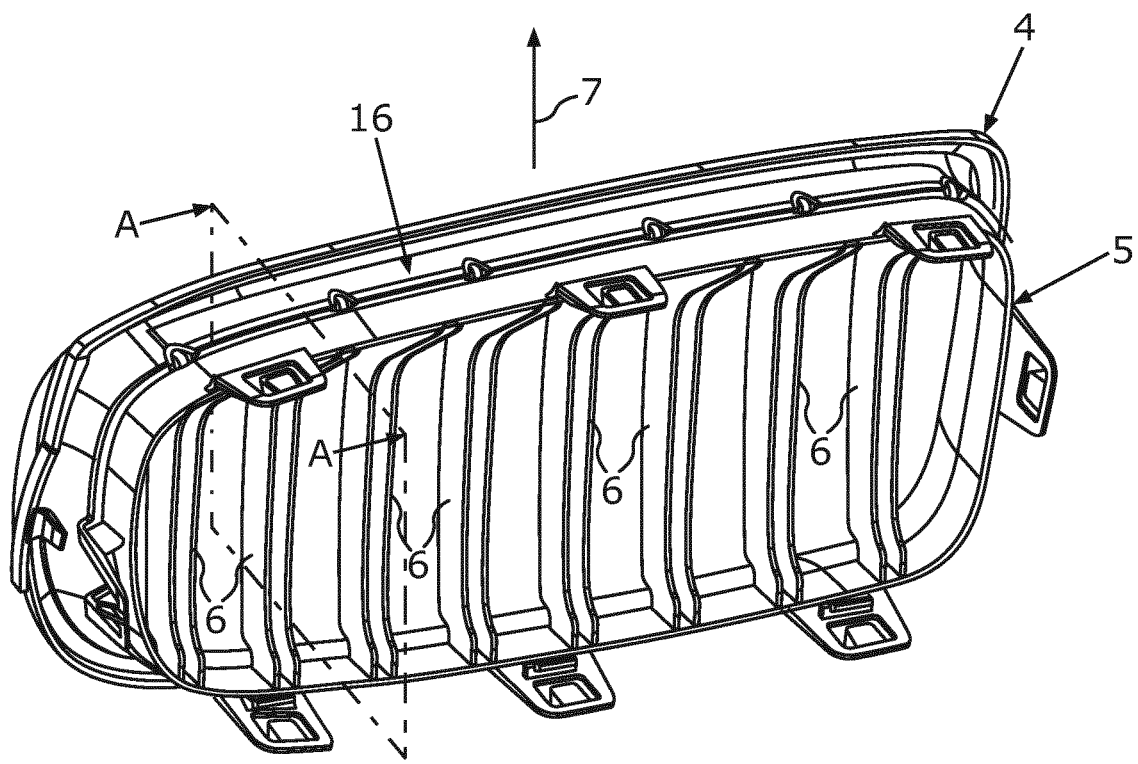
FIG. 3 is a perspective illustration of a first and a second trim part.

The light-emitting device 16 and the at least one illuminant 17 will be described in more detail below. FIG. 3 shows a perspective illustration of the two trim parts 4, 5. It can be seen that the first trim part 4 engages around the second trim part 5 along a perimeter direction of the first trim part 4, while the second trim part 5 engages at least regionally in the first trim part 4. The two trim parts 4, 5 are designed so that air can flow through them, with the result that air can flow toward components of the motor vehicle 8, for example a radiator, an intake suction device, etc., that are arranged downstream of the two trim parts 4, 5 counter to the vehicle longitudinal direction 10 in particular during driving operation of the motor vehicle 8 and that depend on air, in particular incoming air, at least substantially without obstruction. Provision may be made for the two trim parts 4, 5 to be formed in one piece. Alternatively, the two trim parts 4, 5 can be fixed to one another by connecting the two trim parts 4, 5 with a force fit, a form fit and/or a material bond. In the present example, the two trim parts 4, 5 are attached to each other by means of a plurality of latching connections. Alternatively or additionally, an adhesive bond can be used between the trim parts 4, 5 so as to connect them.

Furthermore, it can be seen in FIG. 3 that the light-emitting device 16 is arranged at least partially and/or at least regionally on or in the first trim part 4. In other words, the light-emitting device 16 is integrated entirely or partially into the first trim part 4.

Figure 4:
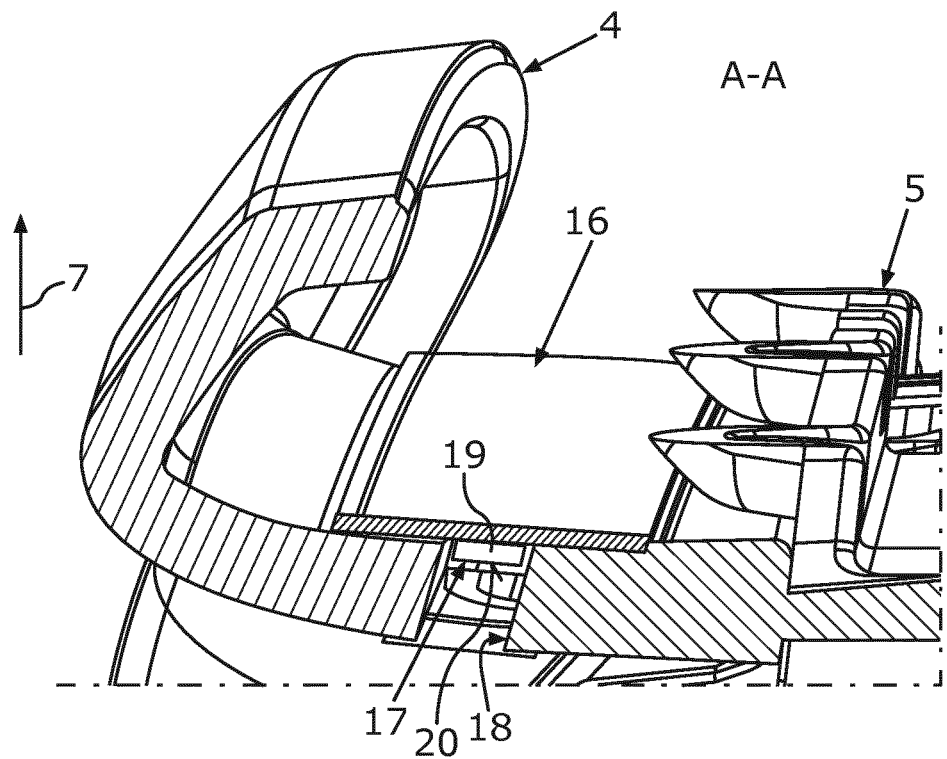
FIG. 4 is a perspective illustration cut along a sectional plane A-A shown in FIG. 3 of the first and the second trim part.

FIG. 4 shows a perspective illustration cut along a sectional plane A-A shown in FIG. 3 of the two trim parts 4, 5. The illuminant 17 of the light-emitting device 16 here engages in a through-opening 18 through which light is able to shine and which entirely penetrates the first trim part 4 along the vertical vehicle direction 7. The illuminant 17 and consequently the light-emitting device 16 comprises an LED or a light-emitting diode 19 or a plurality of LEDs or light-emitting diodes 19 (LED: light-emitting diode). In the present case, the light-emitting device 16 and/or the illuminant 17 is/are embodied at least substantially in the shape of a strip. A strip shape means that a longitudinal extent of the light-emitting device 16 is several times greater than a transverse extent of the light-emitting device 16. The longitudinal extent of the light-emitting device 16 here extends along the perimeter direction of the first trim part 4.

A light exit surface 20 of the light-emitting device 16 or of the illuminant 17 corresponds to the through-opening 18, for example the light exit surface 20 can be arranged within the through-opening 18. At any rate, the light exit surface 20 is arranged in terms of position such that light beams coming from the light exit surface 20 can shine through the through-opening 18.

Figure 5:
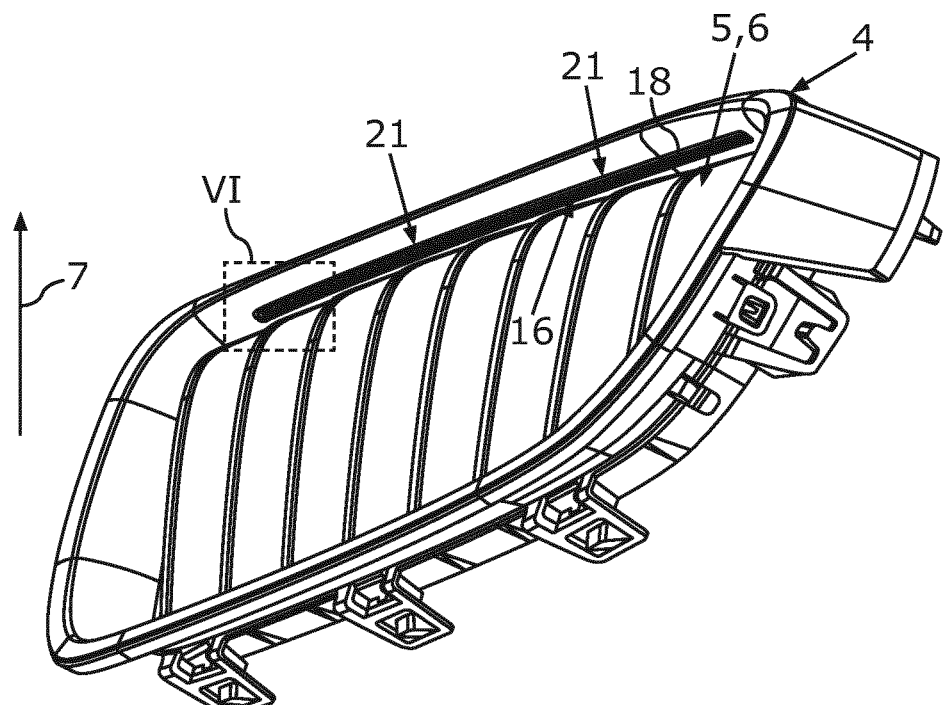
FIG. 5 is a perspective illustration of the first and the second trim part and an light-emitting device.

FIG. 5 shows a perspective illustration of the first trim part 4 and of the second trim part 5 and of the light-emitting device 16. The through-opening 18 is arranged in the vertical vehicle direction 7 above the ribs of the second trim part 5 and can be interrupted, as it is in the present example, by way of at least one bar 21. The at least one bar 21 ensures that an inherent stability of the first trim part 4 does not suffer on account of the through-opening 18.

The light-emitting device 16 is used to illuminate, in its activation state, the second trim part 5 or the respective ribs 6 of the second trim part 5 counter to the vertical vehicle direction 7. In other words, the light produced by means of the light-emitting device 16 shines through the through-opening 18 and downward from above onto the ribs 6 of the second trim part 5. In this case, a light path of the light produced by the light-emitting device 16, in particular between the first trim part 4 and the ribs 6, is realized without reflector or lens. In other words, no element designed to refract, filter, converge and/or reflect the light produced by means of the light-emitting device 16 is arranged between the first trim part 4 and the ribs 6 that are to be illuminated.

Figure 6:
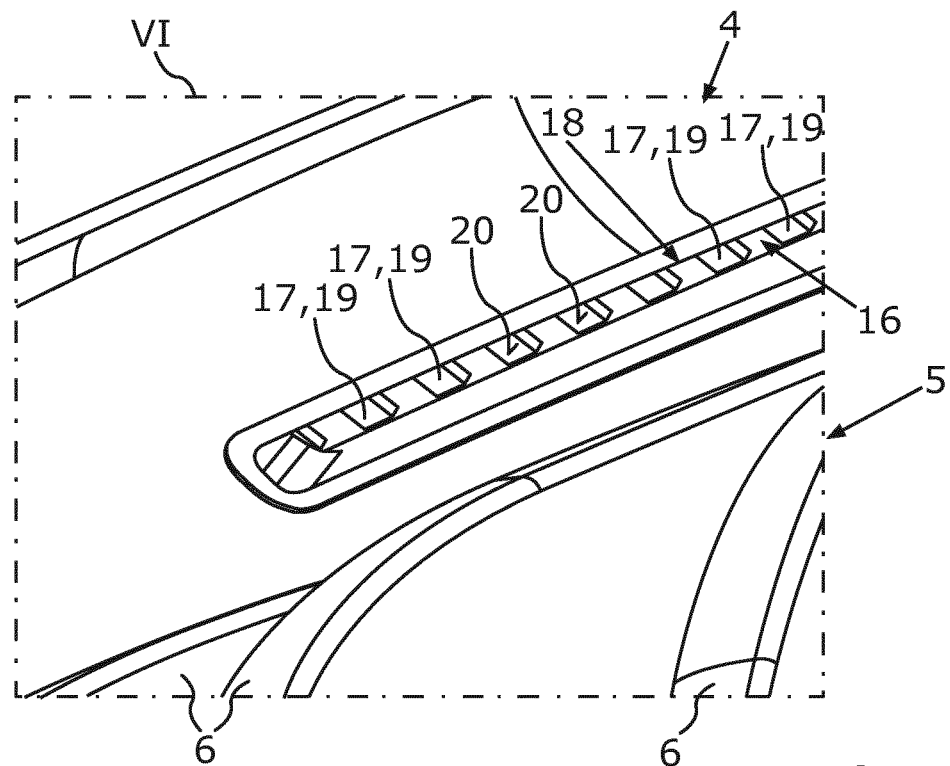
FIG. 6 is an enlarged illustration of a region from FIG. 5.

FIG. 6 shows an enlarged illustration of the region VI from FIG. 5. It can be seen that the light-emitting device 16 has a multiplicity of illuminant 17, wherein the respective illuminant 17 comprises at least one LED or light-emitting diode 19. In particular, the respective illuminant 17 are arranged with spacings at a regular distance from one another along a common carrier strip. Owing to this multiplicity of illuminant 17 or LEDs 19, the second trim part 5 is illuminated particularly uniformly.

The light-emitting device 16 can be used or is used, as described above, to illuminate the region 15 of the front field 11 in front of the motor vehicle front end 2. For this purpose, provision may be made for one or more of the illuminant 17 to be provided for illuminating the region 15 in a targeted manner. In the present example, each of the illuminant 17 is embodied to illuminate the second trim part 5 and the region 15 in the activation state of the light-emitting device 16 such that the region 15 can be supplied with light or illuminated in a targeted fashion by means of the light-emitting device 16. This means that the light-emitting device 16 or the trim element 2 has a double function. First, the light-emitting device 16 is used to provide particularly advantageous light staging for the motor vehicle 8, and secondly, the light-emitting device 16 supports the traffic safety of the motor vehicle 8 because the front field 11 is illuminated particularly efficiently and/or over a large area.

Figure 7:
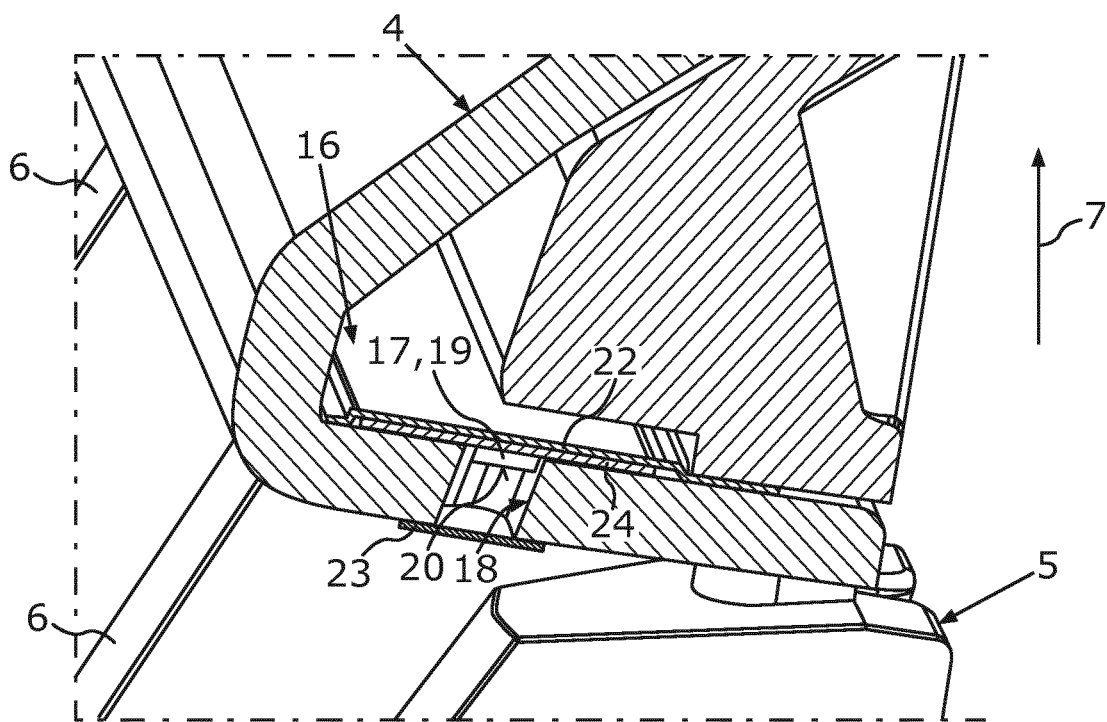
FIG. 7 is a perspective illustration cut along the sectional plane A-A of the two trim parts with the light-emitting device and of an interior and an exterior protective element.

FIG. 7 shows a perspective illustration cut along the sectional plane A-A of the two trim parts 4, 5 with the light-emitting device 16 and of an internal protective element 22 and an external protective element 23. Furthermore, FIG. 7 shows that the respective illuminant 17 is held on a support body 24. That means that the light-emitting device 16 can comprise or have the carrier body 24.

The protective element 22 arranged on the inside on the first trim part 4 serves for protecting the light-emitting device 16 and consequently the carrier body 24 and the respective illuminant 17 in particular against mechanical influences which may occur for example in the case of driving operation or owing to the driving operation of the motor vehicle 8. In the present example, the inside protective element 22 is embodied as an adhesive element, in particular an adhesive strip. The inside protective element 22 or the adhesive strip 22 protrudes at least beyond at least one edge of the light-emitting device 16. In the present example, the adhesive strip 22 protrudes beyond two edges of the carrier element 24 that are parallel to one another such that one adhesive side facing the support body 24 or the light-emitting device 16 protrudes beyond the light-emitting device 16 along the two longitudinal edges. In this way, the adhesive strip 22 or the inside protective element 22 is connected to the light-emitting device 16 in a particularly firm and close manner via the support body 24 such that the inside protective element 22 is held particularly reliably, in particular by means of a material bond, on the carrier body 24 or on the light-emitting device 16. Since the adhesive strip 22 protrudes beyond the light-emitting device 16, it is possible that the adhesive strip 22 enters into a material bond, that is to say an adhesive connection, with the first trim part 4. In this way, the first trim part 4 and the light-emitting device 16 are adhesively bonded by way of the adhesive strip 22, with the result that the light-emitting device 16 is fixedly held on the first trim part 4 by the adhesive strip 22 in a manner that is particularly stable in terms of position. In addition, it is particularly advantageous that in this way the light-emitting device 16 is able to be attached or is attached to the first trim part 4 in a particularly easy manner or with little complexity, in particular at least largely without tools.

The outside protective element 23, which is connected to the trim part 4 and covers the light exit surface 20 of the light-emitting device 16 outside the first trim part 4, can be provided as an alternative or in addition to the inside protective element 22. In order to ensure that the light emitted by the illuminant 17 can radiate at least largely without obstruction from the through-opening 18 and onto of the ribs 6, it is particularly preferred if the outside protective element 23 is embodied at least substantially clearly or such that light is able to shine through it. It is possible that the outside protective elements 23 is embodied as a further adhesive strip embodied by the adhesive strip 22, which covers the through-opening 18, with the result that objects, in particular objects whirled up by a motor vehicle driving ahead, are effectively prevented from being hurled from the outside through the through-opening 18 onto the light-emitting device 16.

With particular preference, the outside protective element 23 is embodied as an at least substantially clear plastics element corresponding to an inner contour of the through-opening 18, with the result that the clear plastics element completely or partially fills the through-opening 18.

Figure 8:
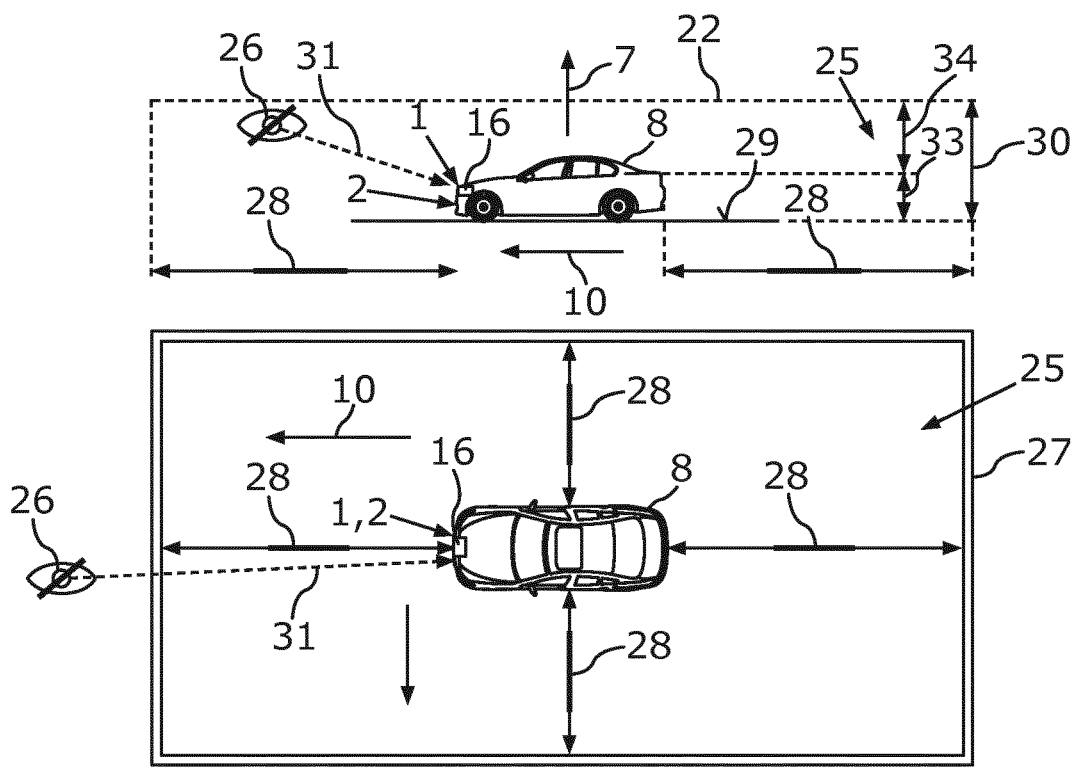
FIG. 8 is a schematic illustration of a specified region in which the motor vehicle is arranged.

FIG. 8 shows a schematic illustration of a specified region 25 in which the motor vehicle 8 is arranged. Within this region 25, a point 26 which is movable freely and three-dimensionally in the region 25 is arranged. The three-dimensional region 25 depends on the external dimensions of the motor vehicle 8 and is defined by a rectangle 27 around the motor vehicle 8, the edges of which are each arranged at a distance 28 from the motor vehicle 8 extending perpendicularly to the motor vehicle 8. With particular preference, the distance 28 in each case is 10 meters (10 m). The rectangle 27 is furthermore embodied parallel to a placement surface 29 of the motor vehicle 8. In the perpendicular direction, that is to say in the vertical vehicle direction 7, the region 25 is defined by the rectangle 27 defining the three-dimensional region 25 in the shape of cuboid in connection with a height 30 perpendicular thereto.

With particular preference, the perpendicular height 30 is 3 meters (3 m). A direct line of sight 31 between the point 26, which is freely movable in the region 25, and the light exit surface 20 of the light-emitting device 16 is interrupted by at least one component of the motor vehicle 8 as soon as the point 26 is arranged in an upper cuboid part 32 of the region 25. In this case, the upper cuboid part 32 is arranged at a distance 33, which is preferably 1 meter (1 m) from the placement surface 29 such that a height 34 of the cuboid part 32 is 2 meters (2 m). In other words, the upper cuboid part 32 of the region 25 forms a region in which the point 26 arranged in it can represent for example a further road user arranged outside the motor vehicle 8.

The respective entirely specific dimension and positional arrangement of the perpendicular distance 28 or of the rectangle 27 and the height 34 are sufficient to observe the legal specifications of ECE R48. After all, in accordance with ECE R48, no direct view onto the illuminant 17 or the light exit surface 20 is permitted in the rectangular distance 27 of 10 m at a height of 1 m to 3 m. This ensures that further road users, in particular users of other passenger cars and/or trucks, are not dazzled by lighting-related devices of the motor vehicle 8 and/or are not distracted from traffic. It is to be understood that, although specifically the regulations of ECE R48 are mentioned here, the trim elements 4, 5 and/or the light-emitting device 16 is/are adaptable to specifications (regions, heights and/or distances) of other legal specifications particularly easily and with little complexity.

An improved protection against dazzling of the further road users, however, is able to be realized if—as described above—the direct line of sight between the further road users arranged within the region 25, in particular within the partial region 32, and the light exit surface 20 is interrupted, with the result that the further road users in the region 25 cannot easily see the light exit surface 20 or the illuminant 17.

Figure 9:
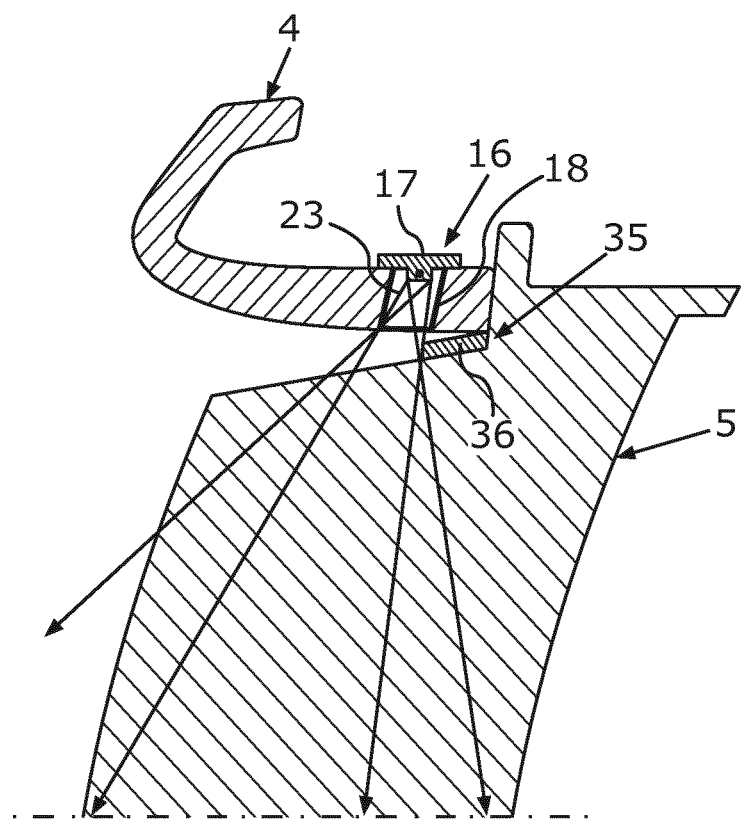
FIG. 9 is a cut illustration of the first and the second trim part with a screening apparatus.

FIG. 9 shows a cut and highly simplified illustration of the first trim part 4 and the second trim part 5 with a screening device 35, having at least one screening element 36. This screening element 36 serves to prevent light exiting the light-emitting device 16 or the through-opening 18 from illuminating parts of the motor vehicle 8 that are not supposed to be illuminated according to regulations. In this case, the at least one screening element 36 can be arranged between the first trim part 4 and the second trim part 5. Furthermore, the at least one screening element 36 is embodied to be opaque, which means that, when it is illuminated by means of the light-emitting device 16, it screens off components that are not to be illuminated.

FIG. 9 furthermore shows that the outside protective element 23 can be integrated at least substantially into the through-opening 18. Moreover, it shows that the outside protective elements 23 can alternatively or additionally surround the at least one illuminant 17 or partially surround the light-emitting unit 16. Since the outside protective element 23 is formed to be clear or light-transmissive, the outside protective element 23 can exhibit, in addition to its protective function for the illuminant 17 or for the light-emitting device 16, a light-guiding and/or light-directing function. Accordingly, the outside protective element 23 can be a light-guiding element or a light-directing element.

The screening apparatus 35 shown in FIG. 9 can furthermore be embodied to interrupt, by means of the at least one screening element 36, the line of sight 31, described in connection with FIG. 8, between the light exit surface 20 and the point or viewer 26 as soon as the point or viewer 26 is placed on the rectangle 27 at a height of 1 m to 3 m. Alternatively or additionally, the screening apparatus 35 can serve for protecting the viewer 26 or the further road users in the region 25 against a dazzling effect. Provision may furthermore be made for the screening effect by means of which the direct line of sight 31 may be interrupted to be attained by means of one or more of the bars 21 (cf. FIG. 5).

Overall, the invention shows how door and front field illumination that is admissible, that is to say follows legal specifications, can be provided. Here, full illumination of the engine compartment, in particular of a water cooler and/or a vehicle-based carrier element, for example a V strut, is prevented, which would otherwise have produced a particularly unattractive appearance of the motor vehicle 8, in particular in a dark environment, for example at night. By moving the at least one illuminant 17 or plurality of illuminant 17 into an upper region of the first trim part 4, which can be embodied in particular as a kidney frame, the perpendicular ribs 6 are irradiated and the vehicle front field 11 is illuminated, in particular in the previously dark region 15. Furthermore, no direct sight onto the illuminant 17 is possible on an external edge from a height of 1 m to 3 m and/or within the region 25 that is relevant for the legislator, in particular the cuboid part 32, as a result of which at the same time lighting-related legal requirements of the door and front field illumination are met. Furthermore, the light emission can be delimited by attaching the screening element 36 counter to the vehicle longitudinal direction 10 such that the engine compartment and consequently the radiator or radiators and/or the V strut are not illuminated in an undesirable fashion and/or are excluded from the illumination by means of the light-emitting device 16. Furthermore, a manufacturer-specific and particularly characteristic staging of a brand-specific icon is possible by means of the trim element 1 according to the invention with the light-emitting device 16.

Provision may be made for the trim element 1 and/or the light-emitting device 16 to be able to be installed or to be installed as an accessory or as a series equipment in the motor vehicle 8. The light-emitting device 16 is controlled as door and front field illumination, wherein control can be effected by means of a control unit that can be an integral constituent part of the motor vehicle 8. Accordingly, the light-emitting unit 16 is connectable to the control unit, for example via a corresponding bus interface.

Due to the use of the LED tape, the light-emitting device 16 is able to be produced particularly efficiently in terms of installation space and/or mass such that the light-emitting device 16 has at most a hardly measurable influence on the efficiency of the motor vehicle 8. In particular, provision may be made for the through-opening 18 to extend obliquely with respect to the vertical vehicle direction 7. That means that a vertical axis of the through-opening 18 and the vertical vehicle axis 7 enclose an angle such that the front field 11, in particular the region 15, is particularly advantageously able to be illuminated by means of the light-emitting device 16 that shines light through the through-opening 18.

Provision may be made for a trim element without light-emitting device 16 to be retrofitted with the latter. In this respect it is conceivable, for example using cutting machining and/or by means of a thermal method, to machine the existing trim element or an existing first trim part and/or an existing second trim part so as to provide installation space for the light-emitting device 16. Accordingly, the light-emitting device 16 can be offered for example as part of accessories sales separately from the trim element.

LIST OF REFERENCE SIGNS

1 Trim element
2 Motor vehicle front end
3 Mirror axis
4 First trim part
5 Second trim part
6 Rib
7 Vertical vehicle direction
8 Motor vehicle
9 Outer skin
10 Longitudinal vehicle direction
11 Front field
12 Main headlamp
13 Light/dark boundary
14 Distance
15 Region
16 Light-emitting device
17 Illuminant
18 Through-opening
19 Light-emitting diode
20 Light exit surface
21 Bar
22 Protective element
23 Protective element
24 Support body
25 Region
26 Point
27 Rectangle
28 Distance
29 Placement surface
30 Height
31 Line of sight
32 Cuboid part
33 Distance
34 Height
35 Screening device
36 Screening element
VI Region

What is claimed is:

1. A trim element for a motor vehicle front end, comprising:
    a first trim part;
    a second trim part comprising a plurality of ribs; and
    a light-emitting device that is at least substantially integrated into the first trim part and by which at least an outer surface of each rib of the plurality of ribs is illuminated outside on the motor vehicle in an activated state of the light-emitting device, wherein:
    the outer surface of each rib of the plurality of ribs faces away from the motor vehicle,
    the light-emitting device comprises at least one illuminant, by way of which a front field in front of the motor vehicle front end is illuminated in a targeted fashion in an activated state of the light-emitting device, and
    the front field in front of the motor vehicle front end comprises a region that is not directly illuminated by main headlamps of the motor vehicle.

2. The trim element according to claim 1, wherein
    each rib of the plurality of ribs is illuminated by the light-emitting device in the activated state thereof counter to a vertical vehicle direction.

3. The trim element according to claim 1, wherein
    a direct line of sight between a point arranged outside the motor vehicle in a specified region and a light exit surface of the light-emitting device is interrupted by at least one component of the motor vehicle.

4. The trim element according to claim 1, wherein
    the first trim part has a through-opening through which light is able to shine and which corresponds to a light exit surface of the light-emitting device.

5. The trim element according to claim 4, wherein the through-opening is arranged obliquely with respect to a vertical vehicle direction.

6. The trim element according to claim 4, wherein the through-opening is interrupted by at least one bar.

7. The trim element according to claim 4, wherein the through-opening is arranged above the second trim part.

8. The trim element according to claim 1, wherein
    the light-emitting device has at least one LED element.

9. The trim element according to claim 1, wherein
    the light-emitting device is embodied at least substantially in the shape of a strip.

10. The trim element according to claim 1, wherein
    the light-emitting device has at least one light-guiding element.

11. The trim element according to claim 1, further comprising:
    a protective element arranged inside on the first trim part and at least partially covering the light-emitting device on the inside of the first trim part.

12. The trim element according to claim 11, further comprising:
    a second protective element arranged on the outside on the first trim part and at least partially covering the light-emitting device on the outside of the second trim part.

13. The trim element according to claim 1, further comprising:
    at least one opaque screening element which is arranged on the first trim part and is irradiated in the activated state of the light-emitting device by the light-emitting device, as a result of which illumination of a component of the motor vehicle that differs from the trim element is prevented.

14. The trim element according to claim 1, wherein the first trim part and the second trim part are formed as a single piece.

15. The trim element according to claim 1, wherein the first trim part is connected to the second trim part.

16. The trim element according to claim 1, wherein each rib of the plurality of ribs extends at least substantially along a vertical vehicle direction.

17. The trim element according to claim 1, wherein the first trim part surrounds the second trim part.

18. The trim element according to claim 1, wherein the first trim part surrounds each rib of the plurality of ribs.

19. A trim element for a motor vehicle front end of a motor vehicle, the trim element comprising:
- a first trim part comprising a through-opening;
- a second trim part comprising a plurality of ribs surrounded by the first trim part, wherein the through-opening of the first trim part is arranged in a vertical vehicle direction above the second trim part; and
- a light-emitting device comprising at least one illuminant in the through-opening of the first trim part, wherein:
- the light-emitting device illuminates the second trim part outside on the motor vehicle and a front field in front of the motor vehicle front end counter to the vertical vehicle direction in a targeted fashion in an activated state of the light-emitting device,
- the front field in front of the motor vehicle front end comprises a region that is not directly illuminated by main headlamps of the motor vehicle, and
- a direct line of sight between a point arranged outside the motor vehicle in a specified region and a light exit surface of the light-emitting device is interrupted by the first trim part.

20. A trim element for a motor vehicle front end, comprising:
- a first trim part;
- a second trim part comprising a plurality of ribs; and
- a light-emitting device that is at least substantially integrated into the first trim part and by which at least each rib of the plurality of ribs is illuminated outside on the motor vehicle in an activated state of the light-emitting device, wherein:
- the light-emitting device comprises at least one illuminant, by way of which a front field in front of the motor vehicle front end is illuminated in a targeted fashion in an activated state of the light-emitting device,
- the front field in front of the motor vehicle front end comprises a region that is not directly illuminated by main headlamps of the motor vehicle,
- the first trim part has a through-opening through which light is able to shine and which corresponds to a light exit surface of the light-emitting device, and
- the through-opening is arranged above the plurality of ribs of the second trim part.

* * * * *